(12) United States Patent
Wasilewski

(10) Patent No.: US 10,134,057 B2
(45) Date of Patent: Nov. 20, 2018

(54) TARGETING OFFERINGS TO A CUSTOMER BASED ON PSYCHOGRAPHIC INFORMATION

(71) Applicant: COX COMMUNICATIONS, INC., Atlanta, GA (US)

(72) Inventor: Louise Mary Wasilewski, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 383 days.

(21) Appl. No.: 13/774,456

(22) Filed: Feb. 22, 2013

(65) Prior Publication Data

US 2014/0244398 A1 Aug. 28, 2014

(51) Int. Cl.
*G06Q 30/02* (2012.01)

(52) U.S. Cl.
CPC ................ *G06Q 30/0269* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 7,050,569 B1* | 5/2006 | Weaver | H04M 3/5238 379/266.01 |
| 7,174,011 B2* | 2/2007 | Kortum et al. | 379/266.06 |
| 8,210,925 B2* | 7/2012 | Johnson | A63F 13/67 463/23 |
| 2002/0138331 A1* | 9/2002 | Hosea | G06F 17/30905 705/7.37 |
| 2004/0174980 A1* | 9/2004 | Knott | H04M 3/42348 379/266.01 |
| 2006/0085408 A1* | 4/2006 | Morsa | G06Q 30/02 |
| 2006/0198505 A1* | 9/2006 | Kortum | H04M 3/4285 379/201.04 |
| 2008/0077478 A1* | 3/2008 | Kim | G06Q 30/02 705/7.32 |
| 2008/0199042 A1* | 8/2008 | Smith | G06Q 30/02 382/100 |
| 2008/0235375 A1* | 9/2008 | Reynolds | G06Q 30/02 709/225 |

(Continued)

*Primary Examiner* — Vincent M Cao
(74) *Attorney, Agent, or Firm* — Eversheds Sutherland (US) LLP

(57) ABSTRACT

Transmitting entertainment information for presentation to a user and receiving, on behalf of the user, user response information responsive to the entertainment information is disclosed. The entertainment information may include a set of questions such as trivia-related questions or polling questions. The user response information may indicate a set of corresponding responses provided by the user in response to the set of questions. The entertainment information may be identified based on available historical preference data associated with the user, demographic data associated with the user or may be randomly selected to gauge user interest. User psychographic data associated with the user may be generated based at least in part on the user response information. At least one offering for targeting to the user such as a product or service offering or a targeted advertisement may be identified based on the user psychographic data and may be transmitted for presentation to the user.

24 Claims, 8 Drawing Sheets

(56) References Cited

U.S. PATENT DOCUMENTS

| | | | |
|---|---|---|---|
| 2009/0066722 A1* | 3/2009 | Kriger | G06Q 30/02 345/619 |
| 2011/0029365 A1* | 2/2011 | Alhadeff | G06Q 30/0222 705/14.23 |
| 2011/0153387 A1* | 6/2011 | Ma | G06Q 10/10 705/7.32 |
| 2011/0173047 A1* | 7/2011 | Kelley | G06Q 30/02 705/7.33 |
| 2012/0195419 A1* | 8/2012 | Ho | G06Q 30/02 379/207.16 |

* cited by examiner

TARGETING OFFERINGS TO A CUSTOMER BASED ON PSYCHOGRAPHIC INFORMATION

BACKGROUND

Current and/or prospective customers of an organization may receive customer service support through a variety of mechanisms including via an online platform, through electronic mail or other electronic communication tools, and/or through telephone interaction. Despite the introduction of alternative platforms, telephone interaction remains a common vehicle for obtaining customer service support. Often, customers seeking customer service support via telephone may be placed on hold for several minutes before being routed to a live agent to receive assistance. Further, customers may be required to navigate through a series of automated menu options prior to being placed on hold which may increase frustration with the customer service experience. While waiting to speak with a live agent, a customer may be presented with general information regarding various product or service offerings. In some scenarios, music may be played or other techniques employed to entertain the customer and minimize the customer's potential frustration with being placed on hold.

More recently, use of interactive voice response (IVR) technology to provide a variety of customer service functions has become commonplace. A customer may interact with an IVR-enabled system by providing voice and/or dual-tone multi frequency (DTMF) input to the system. The IVR-enabled system may receive the customer input and perform any of a variety of customer service-related functions such as presenting prerecorded or dynamically generated audio to the customer that addresses the customer's inquiries, executing account transactions, and so forth. One of the goals associated with the introduction and use of IVR-enabled systems is a reduction in call volumes requiring the assistance of live customer service representatives (CSRs), and thus, a reduction in the number of CSRs that must be employed by an organization. IVR systems have also been employed with the goal of reducing an average wait time for customers to receive customer service assistance.

However, despite the increased use of IVR systems, a large number of customers seeking customer service assistance continue to rely on interaction with a live agent as a means for obtaining such assistance such as in scenarios involving non-routine actions and/or problem resolution. Further, customer frustration with being placed on hold to speak with a CSR continues to be a significant issue as at that point, the customer is generally experiencing a problem requiring expedient resolution. Moreover, organizations may fail to effectively utilize customer hold time to the organization's advantage.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical components; however, different reference numerals may be used to identify similar or identical components as well. Various embodiments may utilize element(s) and/or component(s) other than those illustrated in the drawings and some element(s) and/or component(s) may not be present in various embodiments. The use of singular terminology to describe a component or element may, depending on the context, encompass a plural number of such components or elements and vice versa.

DETAILED DESCRIPTION

Overview

Figure 1:
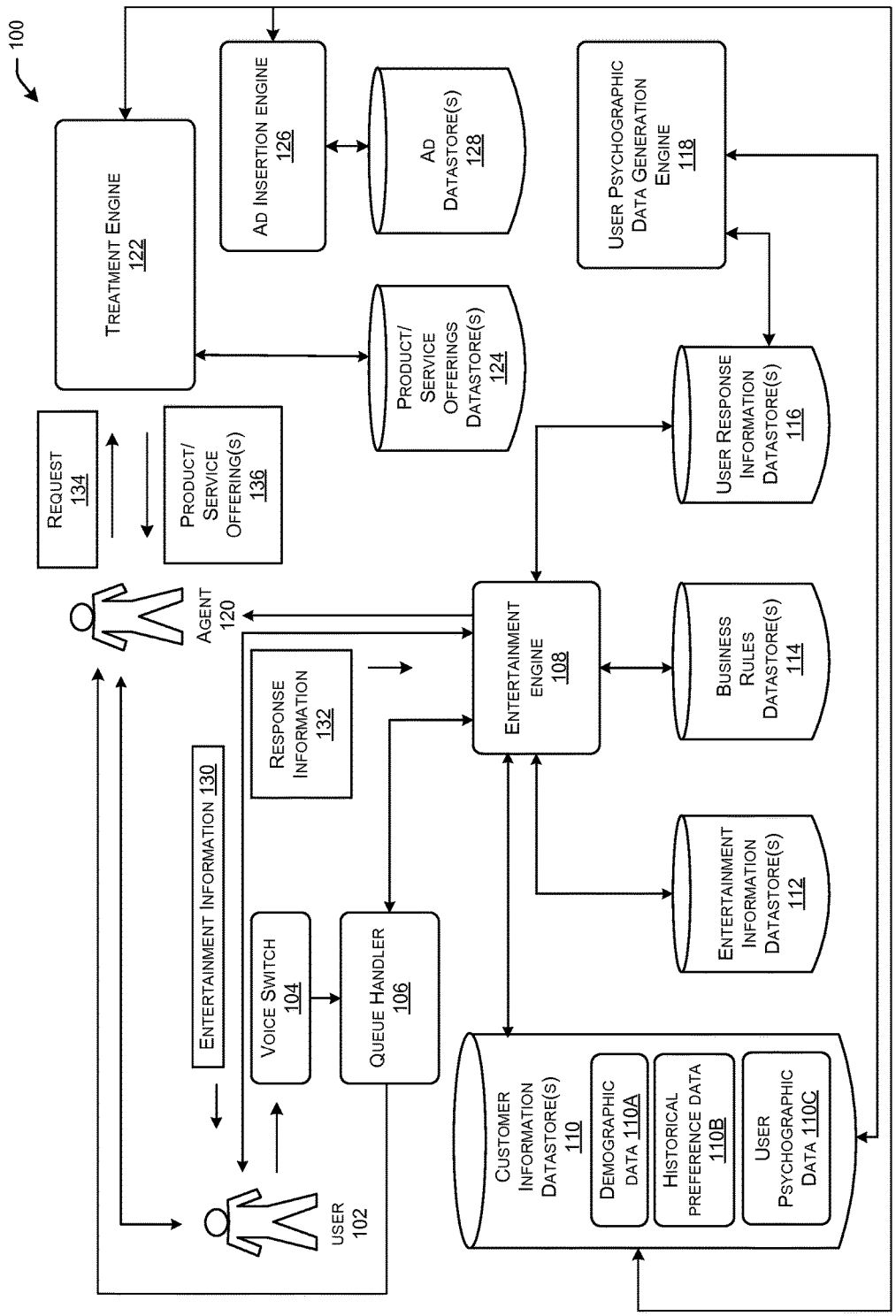
FIG. 1 is a schematic diagram of an illustrative system architecture for generating user psychographic data and for targeting offerings based at least in part on the user psychographic data in accordance with one or more embodiments of the disclosure.

Various platforms have emerged in recent years for providing customer service assistance. Such platforms include online interaction with a customer service representative (CSR), information provided online that addresses frequently asked questions (FAQs), electronic communication tools (e.g., electronic mail), IVR systems, and so forth. However, for many customers, telephone interaction with a live CSR continues to be a most desired vehicle for receiving customer service assistance such as in scenarios involving non-routine transactions.

IVR systems have, in some instances, led to a reduction in customer hold times and have eliminated the need to speak with a live CSR for certain routine customer service-related inquiries. However, there remain a vast number of customer service-related inquiries that IVR systems are not able to adequately address. In addition, despite attempts by organizations to reduce call volumes through the use of IVR systems and online customer service options, interaction with a live CSR rather than an automated system remains a preferred means for obtaining customer service assistance for a significant number of customers. High call volumes coupled with a reduction in customer service personnel by many organizations has meant that prolonged wait or hold times to speak with a live CSR remain a significant source of frustration for many customers.

Currently, organizations employ various tactics to reduce customer frustration with being placed on hold. For example, organizations may present music to the customer, inform the customer of product or service offerings or various promotional offers, or employ various other tactics in an attempt to reduce customer frustration with excessive wait times. In addition, organizations may periodically reassure the customer on hold that he/she will be able to speak with a live CSR shortly, and in some instances, may provide the customer with an estimated hold time. Still further, organizations may maintain a customer's position in a call queue despite a termination of the call and provide a call-back to a number provided by the customer when a live agent is available. However, conventional customer service systems fail to utilize customer hold times to derive benefit for the organizations associated with such systems.

Embodiments of the disclosure relate to, among other things, systems, methods, computer-readable media, techniques and methodologies for generating user psychographic data via interactions between a user and a customer service system and identifying offerings for targeting to the user based at least in part on the generated user psychographic data. The user may be a current customer or subscriber or a prospective customer or subscriber of an organization that hosts, or on whose behalf, the customer service system is hosted.

The offerings that are identified based on the user psychographic data may include any of a variety of product or service offerings and/or advertisements that may be targeted to the user. As a non-limiting example, illustrative product or service offerings may include, but are not limited to, programming content such as television programming content, digital content such as downloadable or online streaming content, voice and/or data packages, and so forth. As a further non-limiting example, illustrative advertisements that may be identified may include, but are not limited to, advertisements that may be dynamically inserted into programming content, advertisements that may be presented in connection with use of a mobile device, and so forth. It should be appreciated that the above examples of product or service offerings and/or advertisements that may be identified based on user psychographic data are merely illustrative and not exhaustive and that numerous other examples are within the scope of this disclosure.

The user psychographic data may be generated based at least in part on user response information received in response to entertainment information transmitted for presentation to the user. A user (e.g., a current or prospective customer) may initiate contact with a customer service system. The customer service system may support functionality for interacting with the user through a variety of mechanisms such as, for example, via telephone, via an online mechanism, and so forth. Entertainment information, such as trivia-related questions or opinion poll questions, may be identified and transmitted for presentation to the user. In certain embodiments, the entertainment information may be transmitted for presentation to the user via audio output from the user's telephone while the user is placed on hold waiting to speak with a live CSR. Additionally or alternatively, the entertainment information may be presented to the user at time periods during which the user is waiting to receive automated processing output from the customer service system and/or at time periods during which the user is placed on hold after having been connected with a live CSR. It should be appreciated that the above examples are merely illustrative and that the entertainment information may be transmitted for presentation to the user at any suitable time period prior to and/or subsequent to initiation of contact by the user.

In various embodiments, the entertainment information may include a set of questions such as, for example, trivia-related questions. As used herein, the term "question" may refer to any question, declarative statement, or any other form or manner of expression that prompts a response. The user response information may include a set of user responses corresponding to the set of questions. Presenting trivia-related questions to a user may serve to diminish the user's frustration with being placed on hold to speak with a CSR while also facilitating the generation of user psychographic data based on responses provided by the user to the questions. Presenting trivia-related questions to a user may also represent a non-intrusive means for generating such user psychographic data as compared to questions that directly inquire as to the user's tastes, preferences, and so forth. The user response information may be analyzed to assess the user's knowledge with respect to various topics and may be used to infer interest (in the form of user psychographic data) in offers pertaining to such topics.

While illustrative embodiments of the disclosure may be described in the context of trivia-related entertainment information, it should be appreciated that this disclosure is not limited thereto and that any suitable entertainment information may be presented to the user. For example, the entertainment information may include a set of questions presented to the user as an opinion poll. The opinion poll questions may inquire as to the user's opinion regarding a variety of topics. Similarly to those embodiments in which the entertainment information includes trivia-related questions, the user's responses to the poll questions may be analyzed and user psychographic information that is indicative of the user's tastes, preferences, and so forth may be generated based on the analysis. The entertainment information may be retrieved from one or more datastores and may be periodically refreshed so that questions are not duplicated for a same user. The entertainment information may be generated internally by an organization that hosts, or on whose behalf, the customer service system is hosted or may be received from a third party in accordance with a contractual agreement.

The questions may have various content classifications associated therewith that classify the questions based on question content. The content classifications may correspond to content categories representative of subject matter areas to which the questions relate. Illustrative content categories may include, but are not limited to, "geography," "history," "politics," "rock music," and so forth. The questions may be further classified in accordance with a hierarchy that includes any number of levels of content sub-categories. As a non-limiting example, within the category of "history," a question may be further classified within a content sub-category of "$20^{th}$ century history," a further content sub-category of "$19^{th}$ century Indian history," and so forth.

In certain embodiments, the entertainment information may be identified based at least in part on available information associated with the user. For example, the entertainment information may be identified based at least in part on demographic information associated with the user such as the user's age, gender, ethnicity, and so forth. Additionally, or alternatively, the entertainment information may be identified based at least in part on historical preference information indicative of one or more preferences associated with the user. In the case of a current subscriber, the historical preference information may indicate, for example, preferences gleaned from products currently held by the subscriber, services currently being offered to the subscriber, product or service offerings previously made to or held by the subscriber, advertisements previously targeted to the subscriber, and so forth. In the case of a prospective customer, available historical preference information may be more limited; however, preferences associated with the prospective customer may nonetheless be gleaned from a variety of sources such as product or service offerings previously made to the prospective customer, online search behavior associated with the prospective customer, and so forth. The historical preference information may be used to assess a subscriber's depth of interest in existing services such as, for example, to probe for interest in segmented movie services (e.g., horror movies) for someone who already subscribes to a generic movie service. In addition, the historical preference information may also be used to assess a subscriber's level of interest in unsubscribed services such as, for example, to assess a movie enthusiast's interest in a sports package.

In various embodiments, entertainment information may be identified based at least in part on an indication for desired entertainment information received from a user. As a non-limiting example, a plurality of candidate content categories may be transmitted for presentation to a user. Prior to transmission of the plurality content categories, authorization to transmit entertainment information may first be solicited and received from the user. An indication of a selection of a content category by the user among the content categories presented may be received by the customer service system, and entertainment information classified according to the selected content category may be identified and transmitted for presentation to the user. For example, the user may be presented with an option of selecting from a variety of content categories such as "geography," "history," "politics," "popular culture," "Oscar winners," and so forth. The user may select a desired content category and an indication of the selection may be received by the customer service system. Entertainment information (e.g., trivia-related questions, opinion poll questions, etc.) categorized or classified according to the selected content category may then be identified and transmitted for presentation to the user.

The user psychographic data generated based at least in part on the received user response information may include any suitable data including, but not limited to, data pertaining to the user's personality, values, traits, attitudes, interests, preferences, opinions and so forth. In various embodiments, the user response information received on behalf of the user may be analyzed to determine an accuracy of the user response information, and at least a portion of the user psychographic data may be generated based at least in part on the determined accuracy of the user response information.

As a non-limiting example, a set of questions classified according to a "science" content category may be presented to the user. In those embodiments in which an accuracy of the responses received from the user is high, data indicating the user's positive preference for science-related subject matter may be generated as at least a portion of the user psychographic data. Similarly, user psychographic data may be also be generated based on an assessment that an accuracy of the user response information is low. For example, if an accuracy of the user's responses to the questions classified according to the "science" content category is low, data indicating the user's lack of preference for science-related subject matter may be generated. Thus, a determined accuracy of the user response information may be correlated, either positively or negatively, with user preferences.

In certain embodiments, at least a portion of the user psychographic data may be generated on the condition that the accuracy of the user response information satisfies a predetermined threshold. For example, a user may be determined to be positively inclined towards a particular subject matter topic if a number of correct responses among the user's responses meets a threshold amount, if a percentage of correct responses among the user's responses meets a threshold percentage, or according to any other suitable metric. Similarly, it may be determined that a user is negatively inclined towards a particular subject matter area if an opposite condition is met. In addition, at least a portion of the user psychographic data may be generated based on the user's selection of a content category. For example, it may be determined that the user has a positive affinity for subject matter classified according to the selected content category and a negative affinity (although of potentially lesser magnitude) for subject matter corresponding to the unselected content categories.

As previously discussed, accumulating user psychographic data in this manner may represent a non-intrusive and more palatable means for gathering information relating to a user's tastes, preferences and so forth in comparison to conventional methodologies. In various embodiments, the user psychographic data may be supplemented with information gleaned through more direct inquiry into the user's psychographic profile such as via a survey or similar mechanism.

In certain embodiments, one or more characteristics associated with the entertainment information transmitted for presentation to the user may be dynamically modified based on an analysis of the user response information. As a non-limiting example, if an analysis of the user response information indicates that an accuracy of the user's responses is low (determined for example according to a methodology such as any of those discussed above), the user may be presented with a set of alternative content categories. An indication of a selection, by the user, of one of the alternative content categories may be received, and entertainment information that corresponds to the selected alternative content category may be presented to the user in lieu of continued presentation of entertainment information similar to that initially presented to the user. In this manner, the characteristics of the entertainment information may be dynamically modified based on an analysis of the user response information.

Upon generation of the user psychographic data, one or more offerings such as product or service offerings and/or targeted advertisements may be identified based at least in part on the user psychographic data and may be transmitted for presentation to the user. As a non-limiting example, user psychographic data that is generated may indicate that the user has a preference or positive affinity towards history related subject matter and sports related subject matter, which may have been determined based at least in part on an analysis of user response information received in response to entertainment information that included questions classified according to those content categories. Still referring to the present non-limiting example, one or more product or service offerings such as content (e.g., programming content, downloadable content, online streaming content, digital video disk (DVD) or the like), voice and/or data packages, and so forth may be identified based on this user psychographic data and presented to the user. The one or more product or service offerings may be presented to the user via a live CSR or in another manner including, but not limited to, subsequent presentation by physical mail, electronic presentation, presentation in the form of an advertisement, or any other suitable mechanism for presentation. In certain embodiments, the offering(s) that are identified based on the user psychographic data may include one or more advertisements targeted for presentation the user as part of a content presentation or the like. The advertisement may potentially be dynamically identified or determined in order to target the advertisement to the user during an active presentation of content. It should be appreciated that the above examples are merely illustrative and not exhaustive and that any suitable offering may be identified based on the user psychographic data and presented to a customer according to any suitable mechanism.

According to various embodiments, the customer service system described herein may be hosted by or on behalf of an organization and may facilitate the provisioning of customer service support to current or prospective customers of product or service offerings sold or marketed by the organization. In certain embodiments, the entertainment information and the user psychographic information may be generated by the organization that provides, or on whose behalf, the customer service system is provided. In other embodiments, the entertainment information may be generated by another party and transmitted for presentation via the customer service system. For example, a third party may generate and provide the entertainment information for a fee. In such embodiments, the organization that hosts, or on whose behalf, the customer service system is provided may additionally contract with the third party to perform analyses on the user response information received in response to the entertainment information in order to generate the user psychographic data. The user psychographic data may be provided to the organization in accordance with any suitable fee arrangement such as a fixed fee arrangement or a subscription-based arrangement. In certain other embodiments, the organization that hosts, or on whose behalf, the customer service system is hosted may provide the user response information and/or the generated user psychographic data to a third party for a fee or based on any suitable arrangement.

Various aspects of this disclosure have been described above through reference to illustrative embodiments. These and other aspects of the disclosure will be described in more detail through reference to the accompanying drawings in the detailed description that follows.

Illustrative Architecture

FIG. 1 schematically depicts an illustrative hybrid process flow and system architecture 100 for generating user psychographic data and for targeting offerings based at least in part on the user psychographic data in accordance with one or more embodiments of the disclosure. While the illustrative architecture 100 will be described in the context of telephone-based interaction between the user 102 and the customer service system, it should be appreciated that embodiments of the disclosure are applicable to numerous other forms of interaction (e.g., online interaction).

The illustrative architecture 100 may include a voice switch 104 via which a user 102 may initiate contact with a customer service system. The voice switch 104 may route the user 102 to a queue handler 106 that may assign a position to the user in a queue that orders users based on, for example, the order in which the users initiated contact with the customer service system. The queue handler 106 may, in various embodiments, receive various identifying information associated with the user such as, for example, an account number, a name, a telephone number, and so forth. The queue handler 106 may support functionality for redirecting users to various entities such as, for example, a CSR or other components of the illustrative architecture 100 as will be described in more detail hereinafter. The queue handler 106 may also support functionality for re-assigning positions to users in the queue based on redirection of a user to a CSR or premature termination of connections between users and the customer service system.

The queue handler 106 may support functionality for redirecting a user to an entertainment engine 108. The entertainment engine 108 may facilitate presentation to the user of entertainment information and receipt of user response information in response thereto. Various datastores 110-120 may be provided from which the entertainment engine 108 and/or other components of the illustrative architecture 100 may retrieve and store information. Although multiple datastores are depicted as storing a variety of types of information, it should be appreciated that information described herein may be stored in any suitable manner and a fewer or greater number of datastores than those described may be provided. As part of the illustrative architecture 100, one or more datastores 110 may be provided that store user information such as, for example, demographic data 110A associated with one or more users, historical data 110B such as historical preference data (including, as a non-limiting example, account information) associated with one or more users, and user psychographic data 110C associated with one or more users (the user psychographic data 110C may be generated in accordance with techniques and methodologies described herein or sourced through other methods). In addition, one or more datastores 112 storing entertainment information may be provided and one or more datastores 114 storing business rules may be provided as well.

The entertainment engine 108 may be configured to access the datastore(s) 112 to retrieve entertainment information 130 for presentation to the user 102. In certain embodiments, the retrieved entertainment information 130 may include a set of questions such as trivia-related questions and/or opinion poll questions. The entertainment information stored in the datastore(s) 112 may be classified or categorized in accordance with various content categories, and entertainment information that corresponds to an identified content category may be retrieved for presentation to the user 102. The content category based on which corresponding entertainment information 130 is retrieved from the datastore(s) 112 may be identified based at least in part on information stored in the datastore(s) 110 such as the demographic data 110A, the historical preference data 110B, and/or previously generated user psychographic data 110C. Additionally, or alternatively, a variety of candidate content categories may be presented to the user 102, and entertainment information 130 corresponding to a content category selected by the user 102 may be retrieved. In those embodiments in which the entertainment information 130 includes polling information, the polling information may be associated with products or services offered by the organization that hosts, or on whose behalf, the customer service system is hosted or may be unrelated such as in scenarios in which the polling conducted as a fee for service for a polling agent.

The retrieved entertainment information 130 may be transmitted for presentation to the user 102 via, for example, an input/output device that the user 102 utilized to access the customer service system. As will be described in more detail later in this disclosure, candidate response information associated with the entertainment information 130 (e.g., select from responses A, B, or C for question 1, select from responses D, E, F or G for question 2, etc.) and instruction information identifying a set of inputs corresponding to selection of the candidate response information (e.g., press 1 for answer A, press 2 for answer B, etc.) may optionally be transmitted in association with the entertainment information 130. The candidate response information and/or instruction information may be stored in association with the entertainment information in the datastore(s) 112 or in one or more distinct datastores.

An indication of user response information 132 may be received by the entertainment engine 108 on behalf of the user 102. For example, the user may indicate responses to the entertainment information 130 by providing voice and/or dual tone multi-frequency (DTMF) input to a device used to interact with the customer service system. In various embodiments, the inputs provided may be selected by the user 102 based on instruction information presented to the user such that each input corresponds to a particular response for a particular question. For example, as previously noted, a plurality of candidate responses may be presented to the user 102 from which the user 102 may indicate a desired response via selection of a corresponding input.

The entertainment engine 108 may receive and store the user response information 132 in one or more datastores 116. A user psychographic data generation engine 118 may be provided that is configured to retrieve or otherwise access the user response information 132 and to generate user psychographic data associated with the user 102 based at least in part on the user response information 132. Alternatively, or additionally, the entertainment engine 108 may communicate the user response information 132 to the user psychographic data generation engine 118 via a "push" or "pull" mechanism. The user psychographic data generation engine 118 may generate the user psychographic data associated with the user 102 based at least in part on an analysis of the user response information 132.

For example, in various embodiments, the user psychographic data generation engine 118 may be configured to analyze the user response information 132 to determine an accuracy of the user response information 132. Psychographic data associated with the user 102 may then be generated based at least in part on the determined accuracy. For example, in those scenarios in which the accuracy of the user response information 132 is high (e.g., a threshold number or percentage of accurate responses were provided by the user 102 to the entertainment information 130), psychographic data indicating a positive affinity, taste, preference or attitude of the user 102 towards subject matter associated with content categories according to which the entertainment information 130 is classified may be generated. Psychographic data indicating an opposite psychographic profile of the user 102 may be generated in those scenarios in which the accuracy of the user response information 132 is low. The psychographic data associated with the user 102 that is generated by the user psychographic data generation engine 118 may be stored as at least a portion of the psychographic data 110C.

In various embodiments, one or more characteristics associated with the entertainment information 130 transmitted for presentation to the user 102 may be dynamically modified based on an analysis of the user response information 132. As a non-limiting example, if the accuracy of the user response information 132 is determined to be low, the psychographic data generation engine 118 may communicate an indication of this to the entertainment engine 108 which may, in turn, retrieve and transmit, for presentation to the user 102, alternate entertainment information corresponding to one or more alternate content categories. In other embodiments, the entertainment engine 108 may modify one or more characteristics associated with the entertainment information 130 dynamically based on psychographic information that is generated and stored in the datastore(s) 110. For example, the entertainment engine 108 may be configured to periodically access the datastore(s) 110 during transmission of the entertainment information 130 to retrieve and analyze the user psychographic data 110C to determine if alternate entertainment information should be presented to the user. The alternate content categories (and thus the corresponding alternate entertainment information) may be identified further based at least in part other information associated with the user 102 such as, for example, the demographic data 110A and/or the historical preference data 110B.

In various embodiments, the entertainment engine 108 may transmit entertainment information in accordance with one or more business rules that may be accessed from one or more datastores 114. The business rules may specify various conditions relating to the selection and/or transmission of the entertainment information. For example, an illustrative business rule may specify that entertainment information is to be transmitted for presentation to a user when an estimated hold time associated with the user meets or exceeds a threshold hold time. As another illustrative and non-limiting example, a business rule may specify that approval from the user must first be obtained prior to transmitting the entertainment information. As yet another illustrative and non-limiting example, a business rule may relate to an entertainment information transmission condition that specifies that a predetermined question having a predetermined difficulty level associated therewith is to be transmitted for presentation to a user when a hold time associated with the user falls below a predetermined threshold (e.g., when the user is next in queue to be transferred to a CSR). Other business rules may relate to conditions that specify whether entertainment information is to be identified based on any of the data stored in the datastore(s) 110, whether alternative entertainment information is to be identified and transmitted for presentation to a user based on an analysis of the user response information, whether alternative content categories are to be identified and transmitted for presentation to a user, and so forth. It should be appreciated that the above examples of business rules that may influence the nature and/or manner in which entertainment information is identified and transmitted are merely illustrative and not exhaustive and that any suitable business rule is within the scope of this disclosure.

Still referring to the illustrative architecture 100, the queue handler 106 may be configured to transmit a message to the entertainment engine 108 on the condition that the user 102 is next in queue to be transferred to an agent 120 such as a live CSR. Upon receipt of the message from the queue handler 106, the entertainment engine 108 may optionally identify and transmit predetermined entertainment information (e.g., a question having a predetermined difficulty level associated therewith that is less than respective difficulty levels associated with previously transmitted questions). The entertainment engine 108 may then transfer the user 102 to the queue handler 106 which may, in turn, transfer the user 102 to the agent 120 when appropriate. Alternatively, or additionally, the entertainment engine 108 may establish a connection between the user 102 and the agent 120 upon receipt of an indication from the queue handler 106 that the user 102 is next in queue to be transferred to the agent 120. It should be appreciated that the above examples are merely illustrative and not exhaustive and that numerous other possibilities for connecting the user 102 and the agent 120 are within the scope of this disclosure.

The agent 120 may be provided with access to a treatment engine 122 that may form part of the illustrative architecture 100. The agent 120 may utilize the treatment engine 122 to identify product or service offerings to target to the user 102 based on user psychographic data 110C generated during the current interaction between the user 102 and the customer service system and/or during prior interactions between the user 102 and the customer service system. More specifically, the agent 120 may submit a request 134 to the treatment engine 122 to identify candidate product or service offerings based on available user psychographic data 110C. The treatment engine 122 may be configured to access the datastore(s) 110 to retrieve at least a portion of the user psychographic data 110C associated with the user 102. The treatment engine 122 may be configured to analyze the retrieved user psychographic data and identify one or more product or service offerings for targeting to the user 102 based on the analysis of the user psychographic data. The treatment engine 122 may retrieve any such identified product or service offerings from one or more datastores 124 and transmit an indication 136 of the identified product or service offerings to the agent 120 for presentation to the user 102. In those embodiments in which no user psychographic data 110C associated with the user 102 is available, the treatment engine 122 may be configured to identify potentially desirable product or service offerings based on demographic data 110A and/or historical preference data 110B associated with the user 102. Further, in other embodiments, the demographic data 110A and/or the historical preference data 110B may be used to supplement the user psychographic data 110C in order to identify product or service offerings more likely to be desirable to the user 102.

In various embodiments, an ad insertion engine 126 may be provided that supports functionality for identifying advertisements for targeting to users. The ad insertion engine 126 may be configured to access the datastore(s) 110, retrieve user psychographic data 110C associated with the user 102, and analyze the user psychographic data 110C to identify one or more advertisements for targeting to the user 102. The advertisement(s) identified based at least in part on the user psychographic data 110C may be retrieved from one or more datastores 128 and targeted to the user 102 as part of a future or current presentation of content to the user 102. As a non-limiting example, an advertisement may potentially be dynamically identified or determined based at least in part on user psychographic data during an active presentation of content to the user 102 and targeted to the user 102 during the content presentation.

It should be appreciated that the entertainment engine 108, the user psychographic data generation engine 118, the treatment engine 122, and the ad insertion engine 126 may each include any respective combination of software, firmware, and/or hardware for enabling associated functionality to be performed. Further, any software and/or firmware for implementing any of the functionality supported by the above-described components may be executed by distinct devices, may be executed in a distributed fashion across multiple devices, or in accordance with any other suitable mechanism. While FIG. 1 depicts a hybrid process flow and system architecture 100 that is applicable to various embodiments of the disclosure, it should be appreciated that various other architectural configurations for implementing various methods and functionality disclosed herein are also within the scope of this disclosure.

Figure 2:
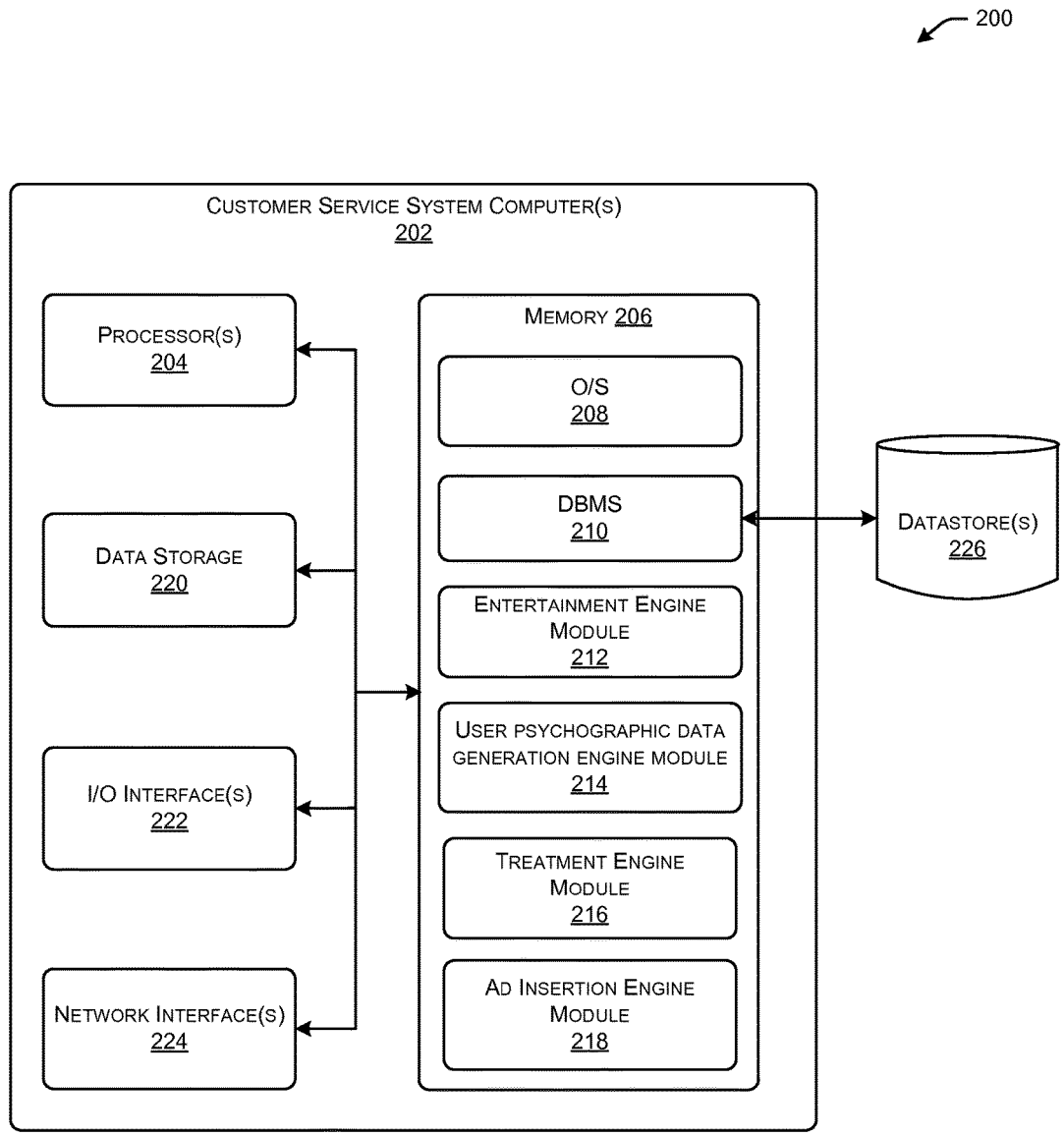
FIG. 2 is a schematic block diagram of an illustrative computing device for facilitating the generation of user psychographic data and the targeting of offerings based at least in part on such data in accordance with one or more embodiments of the disclosure.

FIG. 2 depicts an illustrative computing device 200 that may support functionality for implementing at least a portion of the techniques and methodologies described herein. In various embodiments, the computing device 202 may be a customer service computer 202 that may form part of a customer service system in accordance with one or more embodiments of the disclosure. It should be appreciated that the customer service computer 202 is merely an illustrative device for supporting at least a portion of the functionality described herein and may operate in conjunction with any number of other suitable components or elements.

The customer service computer 202 may include one or more processors (processor(s)) 204 and one or more memories 206 (hereinafter collectively or individually referred to as memory 206). The processor(s) 204 may include any suitable processing unit capable of accepting digital data as input, processing the input data based on stored computer-executable instructions, and generating output data. The computer-executable instructions may be stored, for example, in the memory 206 and may include operating system software, application software, program modules, and so forth. The processor(s) 204 may be configured to execute the computer-executable instructions to cause various operations to be performed. The processor(s) 204 may include any type of processing unit including, but not limited to, a central processing unit, a microprocessor, a microcontroller, a Reduced Instruction Set Computer (RISC) microprocessor, an Application Specific Integrated Circuit (ASIC), a System-on-a-Chip (SoC), a field-programmable gate array (FPGA), and so forth.

The memory 206 may store program instructions that are loadable and executable by the processor(s) 204, as well as data manipulated and generated by the processor(s) 204 during execution of the program instructions. Depending on the configuration and implementation of the customer service computer 202, the memory 206 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 206 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The illustrative computing device 202 may further include additional data storage 220 such as removable storage and/or non-removable storage including, but not limited to, magnetic storage, optical disk storage, and/or tape storage. Data storage 220 may provide non-volatile storage of computer-executable instructions and other data. The memory 206 and/or the data storage 220, removable and/or non-removable, are examples of computer-readable storage media (CRSM).

The illustrative computer 202 may further include network interface(s) 224 that allow the computer 202 to communicate with other devices or application software via one or more networks such as cellular voice and/or data networks, metropolitan-area networks (MANs), wide-area networks (WANs), local area networks (LANs), the Internet, private networks, and so forth. The computer 202 may additionally include one or more input/output (I/O) interfaces 222 (and optionally associated software components such as device drivers) that may support a various I/O devices, such as a keyboard, a mouse, a pen, a voice input device, a touch input device, a display, speakers, a camera, a microphone, a printer, and so forth, for receiving user input and/or providing output to a user.

Referring again to the memory 206, various modules may be stored therein that may comprise computer-executable instructions that when executed by the processor(s) 204 cause various operations to be performed. For example, the memory 206 may have loaded therein an operating system (O/S) 208 that provides an interface between other application software (e.g., dedicated applications, a browser application, a web-based application, etc.) executing on the computer 202 and hardware resources of the computer 202. More specifically, the O/S 208 may include a set of computer-executable instructions for managing hardware resources of the computer 202 and for providing common services to other application programs (e.g., managing memory allocation among various application programs). The O/S 208 may include any operating system now known or which may be developed in the future including, but not limited to, any mobile, desktop, mainframe or other operating system.

The memory 206 may further include a database management system (DBMS) 210 for accessing, retrieving, storing, and/or manipulating data stored in one or more datastores 226. The datastore(s) 226 may include, for example, any of datastores 110-116, 124 and/or 128. The DBMS 210 may utilize any of a variety of database models (e.g., relational model, object model, etc.) and may support any of a variety of query languages.

The memory 206 may additionally include various other program modules that may provide various associated functionality. For example, the memory 206 may include an entertainment engine module 212, a user psychographic data generation engine module 214, a treatment engine module 216, and an ad insertion engine module 218. The various modules depicted in FIG. 2 may include computer-executable instructions loadable into the memory 206 and executable by the processor(s) 204 and may form at least a portion of the respective corresponding elements depicted in FIG. 1. Accordingly, the various modules depicted as being loadable into the memory 206 may support at least a portion of the functionality provided by the corresponding elements described through reference to FIG. 1. For example, the entertainment engine module 212 may represent a portion of the entertainment engine 108 such that the entertainment engine 108 may include the entertainment engine module 212 and, optionally, additional software, firmware, and/or hardware components. It should be appreciated that the entertainment engine module 212, the user psychographic data generation engine module 214, the treatment engine module 216, and the ad insertion engine module 218 may be provided in association with distinct devices (e.g., distinct customer service computers 202) or may be provided, at least in part, on one or more of the same customer service system computers 202. Further, any of the above-described modules may form at least part of one or more distributed applications executable by multiple devices (e.g., multiple customer service system computers 202) in a distributed fashion.

It should be appreciated that each of the above-mentioned modules may, in various embodiments, represent a logical partitioning of functionality supported by the computer 202. This logical partitioning may not be representative of the structure of software, firmware and/or hardware for implementing the functionality. Accordingly, it should be appreciated that functionality described as being provided by a particular module may, in various embodiments, be provided at least in part by one or more other modules or components. Further, one or more depicted modules may not be present in certain embodiments, while in other embodiments, additional modules not depicted may be present and may support at least a portion of the described functionality and/or additional functionality.

Illustrative Processes

Figure 3A:
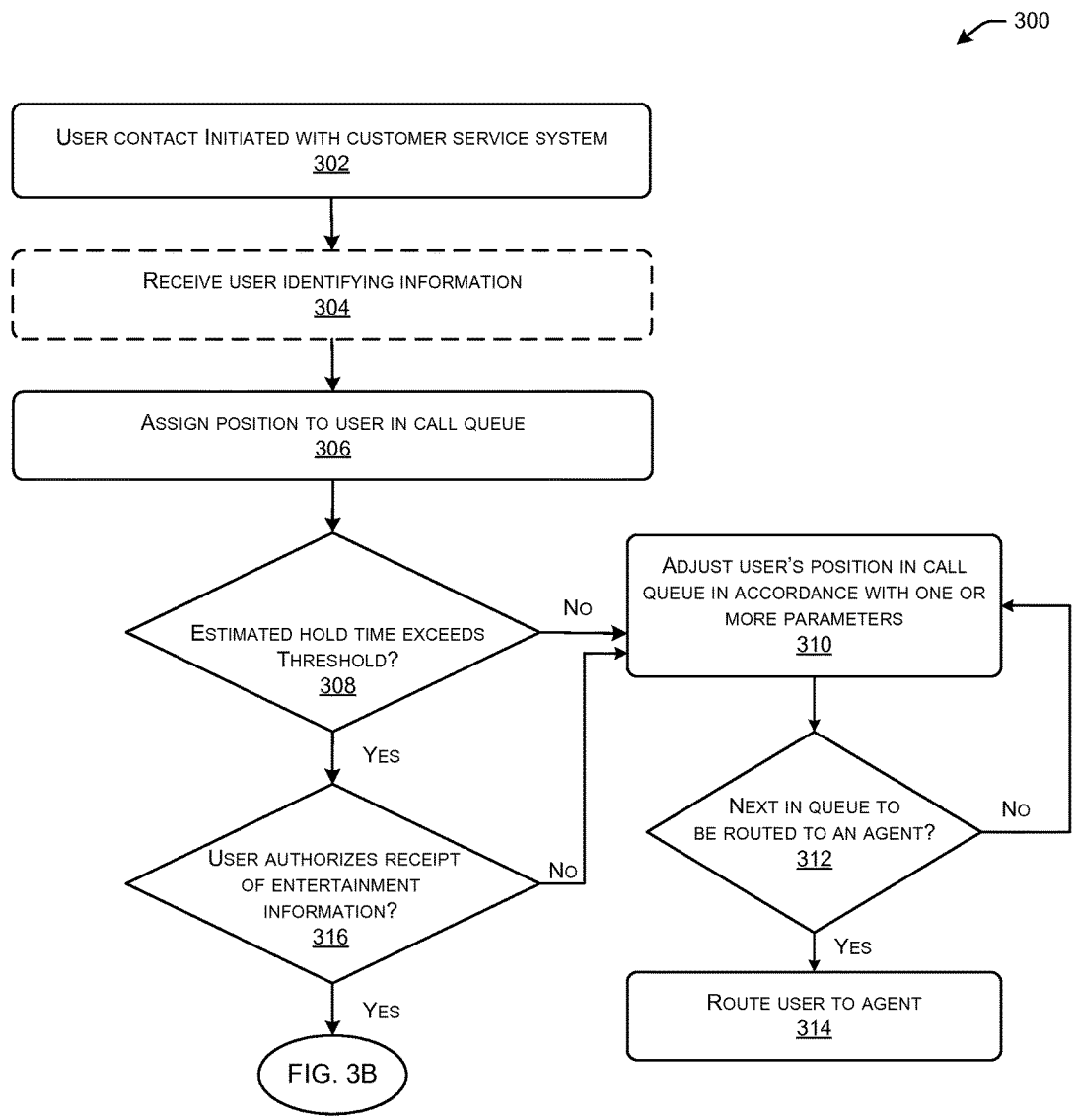
FIGS. 3A-3B are process flow diagrams of an illustrative method for identifying entertainment information for presentation to a user, receiving user response information associated with the entertainment information and generating user psychographic data based at least in part on the user response information in accordance with one or more embodiments of the disclosure.
Figure 3B:
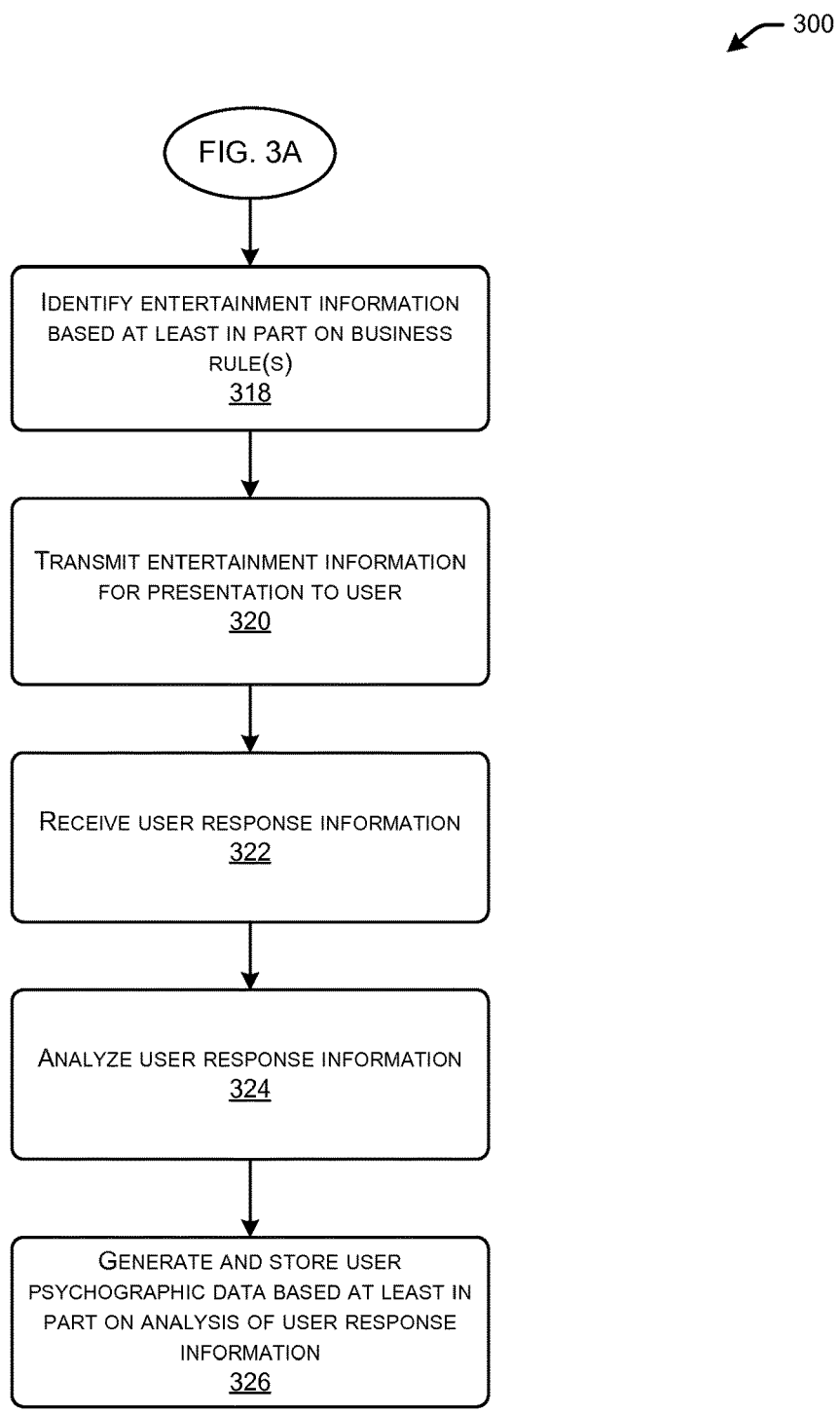

FIGS. 3A-3B are process flow diagrams of an illustrative method 300 for identifying entertainment information for presentation to a user, receiving user response information associated with the entertainment information and generating user psychographic data based at least in part on the user response information in accordance with one or more embodiments of the disclosure.

Referring to FIG. 3A, at block 302, a user may initiate contact with a customer service system hosted by, or on behalf of, or otherwise associated with an organization that provides customer service to current and/or prospective customers. The customer service system may include, for example, one or more of the customer service system computers 202 depicted in FIG. 2 and any of the components depicted in FIG. 1. The user may initiate contact and subsequently interact with the customer service system using any of a variety of mechanisms including, but not limited to, telephone-based interaction, online interaction, and so forth. For example, in certain embodiments, the user may initiate contact with the customer service system via the voice switch 104.

At block 304, the customer service system may optionally receive identifying information associated with the user. For example, in certain embodiments, the voice switch 104, queue handler 106, and/or one or more other components of the customer service system may prompt the user for various identifying information including, but not limited to, an account number, a name, another form of identifier associated with the user (e.g., a social security number), a phone number, and so forth. Alternatively, the customer service system may automatically determine the identifying information. In certain embodiments, the voice switch 104 may transfer the user to the queue handler 106 which may receive or otherwise determine the identifying information.

At block 306, the queue handler 106 may assign a position to the user in a call queue of users waiting to receive customer service. The user's position in the queue may be determined based on any suitable criteria such as, for example, an order in which the user initiated contact with the customer service system with respect to other users.

At block 308, a determination of an estimated hold time for the user may be made. In certain embodiments, the queue handler 106 may be configured to determine the estimated hold time for the user. If it is determined that the estimated hold time for the user does not exceed a threshold time, the method 300 may proceed to block 310 where the user's position in the queue may be adjusted in accordance with one or more parameters. For example, as users are transferred to live customer service agents or connections between users and the customer service system are prematurely terminated, the user's position in the call queue may be adjusted. A determination may be periodically made at block 312 as to whether the user is next in the call queue to be transferred to an agent. In various embodiments, the determination at block 312 may be made in parallel with the adjustment in the user's position in the call queue. Upon a positive determination that the user is next in the queue to be transferred to an agent, the method 300 may proceed to block 314 where the user may be routed to an appropriate agent. As previously noted and as will be described in more detail through reference to FIG. 4, in various embodiments, upon receiving an indication from, for example, the queue handler 106 that the user is next in the call queue to be transferred to an agent, computer-executable instructions provided as part of the entertainment engine module 212 may optionally be executed to cause transmission of predetermined entertainment information (e.g., a question having a predetermined difficulty level associated therewith) for presentation to the user.

Referring again to block 308, if a determination is made that the estimated hold time for the user exceeds a threshold time, the method 300 may proceed to decision block 316 where a determination may be made as to whether the user has authorized receipt of entertainment information. For example, in various embodiments, computer-executable instructions provided as part of the entertainment engine module 212 may be executed to cause a request for authorization to transmit entertainment information to be transmitted for presentation to the user. The user may then indicate whether transmission of entertainment information is authorized by providing corresponding input to a device used to interact with the customer service system. Upon a determination that the user does not wish to receive entertainment information based at least in part on receipt of a corresponding input, the method 300 may proceed to block 310 and the user's position in the call queue may be adjusted in accordance with various parameter(s) as described earlier. On the other hand, if it is determined that the user does wish to receive entertainment information, the method may proceed to block 318.

Referring now to FIG. 3B, at block 318, entertainment information may be identified based at least in part on various business rule(s). For example, the business rule(s) may specify that entertainment information is to be identified based at least in part on a content category selected by the user. As another non-limiting example, the entertainment information may be identified based at least in part on demographic data 110A and/or historical preference data 110B associated with the user. As yet another non-limiting example, the entertainment information may be identified based at least in part on user psychographic data 110C generated through previous interactions with the user. It should be appreciated that numerous other business rules for identifying entertainment information may be specified.

At block 320, entertainment information may be transmitted for presentation to the user. For example, computer-executable instructions provided as part of the entertainment engine module 212 may be executed to cause the entertainment information to be transmitted for presentation to the user via, for example, an input/output device utilized by the user to interact with the customer service system.

At block 322, an indication of user response information may be received. As previously described and as will be described in more detail through reference to FIG. 4, candidate response information may be transmitted for presentation to the user in association with the entertainment information. In certain illustrative embodiments, the entertainment information may comprise a set of questions such as trivia-related questions. In such embodiments, the candidate response information may comprise a respective set of candidate responses for each question. Instruction information may also be transmitted for presentation to the user in association with the entertainment information and the candidate response information. The instruction information may identify a corresponding input via which the user may indicate selection of a particular candidate response. In certain embodiments, the entertainment information may comprise an opinion poll including a set of polling questions. In such embodiments, candidate response information that includes a predetermined set of candidate responses for each poll question (e.g., predefined responses indicative of a user's level of interest, support, etc. in or for various topics or issues) may be transmitted for presentation to the user. Corresponding instruction information may be transmitted in association with the candidate response information.

Upon receipt of the indication of the user response information, the entertainment engine 108 may be configured to store the user response information in the datastore(s) 116. For example, computer-executable instructions provided as part of the entertainment engine module 212 may be executed to cause the user response information to be stored in the datastore(s) 116. In various embodiments, the user psychographic data generation engine 118 may be configured to retrieve the user response information from the datastore(s) 116 and analyze the user response information at block 324. For example, computer-executable instructions provided as part of the user psychographic data generation engine module 214 may be executed to cause the user response information to be retrieved and analyzed. In various other embodiments, the entertainment engine 108 may be configured to communicate the user response information to the user psychographic data generation engine 118 for analysis. In still other embodiments, the entertainment engine 108 may be configured to perform at least a portion of the analysis of the user response information.

At block 326, user psychographic data associated with the user may be generated based at least in part on the analysis of the user response information. For example, computer-executable instructions provided as part of the user psychographic data generation engine module 214 may be executed to generate and store the user psychographic data as part of the user psychographic data 110C in the datastore(s) 110. The user psychographic data generated based at least in part on the analysis of the received user response information may include any suitable data including, but not limited to, data pertaining to the user's personality, values, traits, attitudes, interests, preferences, inferred age group, opinions and so forth. As will be described in more detail through reference to FIG. 6 for example, the user response information may be analyzed to determine an accuracy of the user response information, and at least a portion of the user psychographic data may be generated based at least in part on the determined accuracy of the user response information. User psychographic data generated in this manner may be used to identify offerings for targeting to the user.

In various embodiments, the queue handler 106 may be configured to support at least a portion of the functionality described with respect to blocks 306-314, the entertainment engine 108 may be configured to support at least a portion of functionality described with respect to blocks 316-322, and the user psychographic data generation engine 118 may be configured to support at least a portion of the functionality described with respect to blocks 324-326. However, it should be appreciated that any of the functionality described with respect to FIGS. 3A-3B may be supported in any suitable manner by any of the components of the illustrative architecture of FIG. 1 and the illustrative computing device of FIG. 2.

Figure 4:
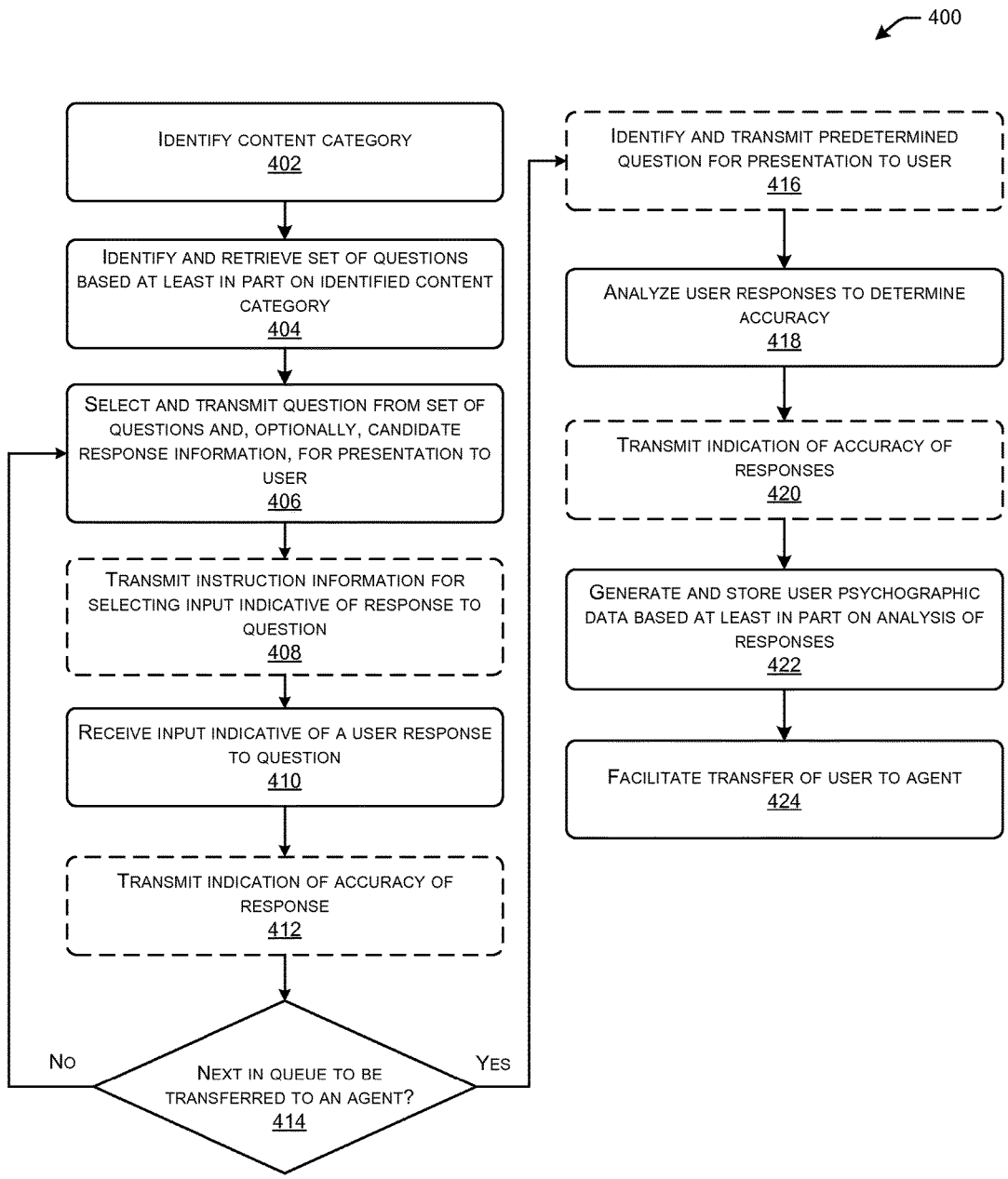
FIG. 4 is a process flow diagram of an illustrative method for identifying entertainment information for presentation to a user based at least in part on an identified content category, receiving user response information associated with the entertainment information, generating user psychographic data based at least in part on the user response information, and facilitating the transfer of the user to a customer service agent in accordance with one or more embodiments of the disclosure.

FIG. 4 is a process flow diagram of an illustrative method 400 for identifying entertainment information for presentation to a user based at least in part on an identified content category, receiving user response information associated with the entertainment information, generating user psychographic data based at least in part on the user response information, and facilitating the transfer of the user to a customer service agent in accordance with one or more embodiments of the disclosure. In various embodiments, the illustrative method 400 may be performed at least in part by the entertainment engine 108, or more specifically, upon execution of computer-executable instructions provided as part of the entertainment engine module 212.

At block 402, a content category may be identified. The content category may be identified based at least in part on input received from the user indicating a content category selected by the user from among a set of candidate content categories presented to the user. Additionally, or alternatively, the content category may be identified based at least in part on demographic data and/or historical preference data associated with the user. In still further embodiments, the content category may be identified based at least in part on an analysis of user response information and/or based at least in part on previously generated user psychographic data associated with the user.

At block 404, a set of questions (e.g., trivia-related questions, polling questions, etc.) may be identified based at least in part on the identified content category. For example, a set of questions that are classified or categorized in accordance with the identified content category may be identified and retrieved from the entertainment information datastore(s) 112. Although the illustrative method 400 may be described in the context of questions that are transmitted to the user, it should be appreciated that the method 400 is more broadly applicable to any suitable type or form of entertainment information.

At block 406, a question from the set of questions may be selected and transmitted for presentation to the user. The question may be selected in accordance with any suitable selection criteria. For example, the questions may be selected based on a difficulty level associated with the question. In certain embodiments, candidate response information may be transmitted for presentation to the user in association with the question. The candidate response information may comprise a set of candidate responses to the question. In certain embodiments, no candidate response information may be transmitted and the user may indicate a response to the question via, for example, voice input.

At block 408, instruction information may optionally be transmitted for presentation to the user. The instruction information may identify a set of inputs corresponding to the candidate response information such that selection of a particular input by the user corresponds to selection of a particular response among the candidate response information. As previously noted with respect to the candidate response information, in certain embodiments, no instruction information may be transmitted to the user.

At block 410, input indicative of a response to the transmitted question may be received. The response may be identified based on a predefined association between the received input and the response. In certain embodiments, the received input may have been provided by the user to an input/output device (e.g., a telephone) in accordance with instruction information transmitted to the user and may correspond to one of a set of candidate responses to the question. At block 412, an indication of an accuracy of the user response may optionally be transmitted for presentation to the user prior to transmission of a next question.

At block 414, a determination may be made as to whether the user is next in the call queue to be transferred to a customer service agent. In certain embodiments, the determination may be made based on whether the entertainment engine 108 has received an indication that the user is next in the call queue from the queue handler 106. For example, as long as no such indication is received, it may be determined that the user is not next in the call queue, and the method 400 may again proceed to block 406 where an additional question from the question set may be selected for presentation to the user. If, on the other hand, an indication that the user is next in the call queue is received by the entertainment engine 108 from the queue handler 106, the method 400 may proceed to block 418.

At block 416, a predetermined question may optionally be identified and transmitted for presentation to the user. In certain embodiments, the predetermined question may correspond to a question having a predetermined difficulty level associated therewith such as, for example, a difficulty level that is less, potentially substantially less, than previous questions transmitted to the user. This provides the user with a positive final experience before being transferred to the agent. The predetermined question may be selected from a group of questions having similar difficulty levels and may or may not comprise subject matter related to previous questions transmitted to the user.

At block 418, the responses received from the user may be analyzed to determine their accuracy. Although the analysis of the user responses is illustratively depicted as being performed subsequent to receipt of all user responses, it should be appreciated that numerous variations are within the scope of the disclosure. For example, in certain embodiments, each user response may be analyzed dynamically upon receipt to determine an accuracy of the response.

At block 420, an indication of the accuracy of the user responses may optionally be transmitted for presentation to the user. It should be appreciated that other variations are within the scope of the disclosure. For example, in certain embodiments, an indication of the accuracy of a response may be transmitted subsequent to receipt of the response and prior to transmission of a next question to the user. In those embodiments in which the entertainment information includes an opinion poll comprising various polling questions, the accuracy of the user response information may not be assessed and, as such, an indication of accuracy may not be presented to the user.

At block 422, psychographic data associated with the user may be generated based at least in part on an analysis of the user responses. For example, as previously described, user psychographic data may be generated based at least in part on a determined accuracy of the responses (e.g., a number of correct/incorrect responses, a percentage of correct/incorrect responses, etc.). Additionally, or alternatively, the user psychographic data may be generated based at least in part on one or more content categories from which the questions transmitted to the user were selected. In certain embodiments, such as in the case of opinion polls, the user response information may be analyzed to assess user preferences, tastes, opinions, and so forth based on whether the response information indicates a positive or negative affinity for various topics or issues addressed by the entertainment information. Thus, in such embodiments, user psychographic information may be generated based on an analysis of the user response information that may not include determining an accuracy of the user response information.

It should be appreciated that numerous analysis criteria may be used to generate the user psychographic data. For example, timing characteristics associated with the user responses may be analyzed to generate the user psychographic data. The timing characteristics may include, for example, an amount of time taken by the user to provide a response, a number of questions for which responses were provided by the user prior to requesting questions corresponding to an alternative content category, and so forth. While the user psychographic data is depicted in illustrative method 400 as being generated subsequent to receipt of all user responses, it should be appreciated that the psychographic data may be incrementally generated upon receipt of one or more of the user responses at predefined triggers such as selection of questions from an alternative content category or in accordance with any other suitable mechanism.

At block 424, transfer of the user to an agent may be facilitated. For example, the entertainment engine 108 may be configured to transfer the user to the queue handler 106 which may, in turn, coordinate transfer of the user to a live customer service agent. As described previously and as will be described in more detail through reference to FIG. 7 for example, the user psychographic data generated as part of the illustrative method 400 may be used to identify offerings for targeting to the user.

Figure 5:
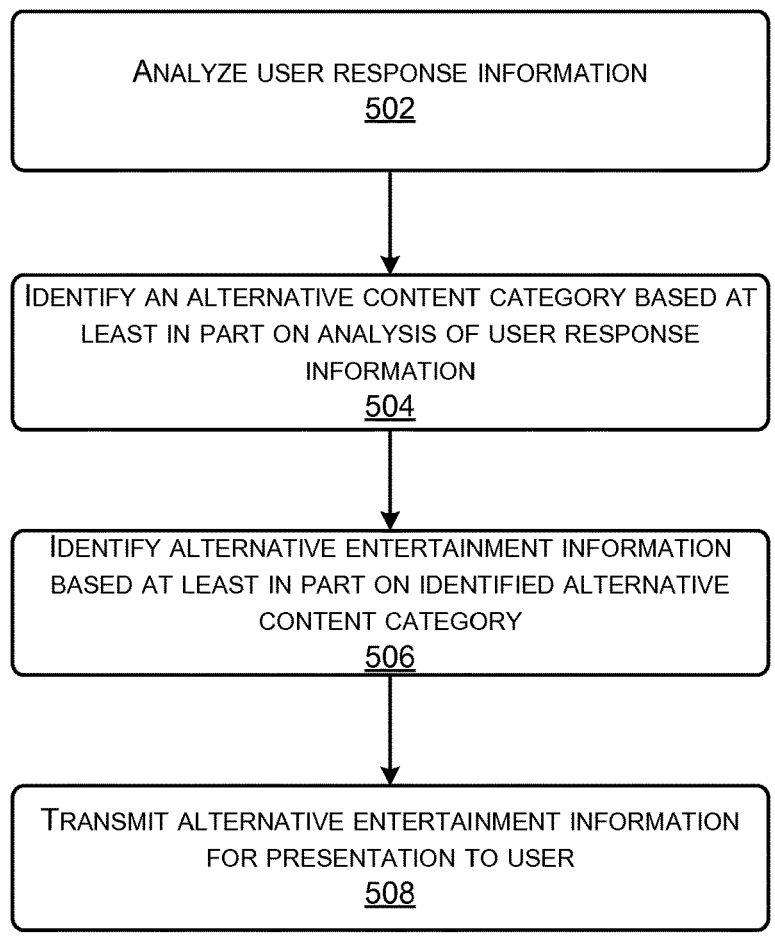
FIG. 5 is a process flow diagram of an illustrative method for analyzing user response information and identifying alternative entertainment information for presentation to a user based at least in part on the analysis in accordance with one or more embodiments of the disclosure.

FIG. 5 is a process flow diagram of an illustrative method 500 for analyzing user response information and identifying alternative entertainment information for presentation to a user based at least in part on the analysis in accordance with one or more embodiments of the disclosure. In various embodiments, the illustrative method 500 may be performed at least in part by the entertainment engine 108 and/or the user psychographic data generation engine 118, or more specifically, upon execution of computer-executable instructions provided as part of the entertainment engine module 212 and/or the user psychographic data generation engine module 214.

The illustrative method 500 assumes that entertainment information corresponding to one or more content categories has been identified and transmitted for presentation to a user and that user response information in response thereto has been received on behalf of the user. At block 502, the user response information may be analyzed. The user response information may be analyzed in accordance with any of the previously discussed methodologies including, for example, assessment of an accuracy of the user response information. In various embodiments, the computer-executable instructions provided as part of the user psychographic data generation engine module 214 may be executed to perform the analysis of the user response information. Results of the analysis may be communicated from the user psychographic data generation engine 118 to the entertainment engine 108.

At block 504, an alternative content category may be identified based at least in part on the analysis of the user response information. In certain embodiments, it may be determined that an alternative content category should be identified if an accuracy of the user response information is low (e.g., a number or percentage of correct responses to questions falls below a threshold value). In other embodiments, it may be determined that an alternative content category should be identified if a threshold number of questions corresponding to a particular content category have been transmitted to the user. In still other embodiments, it may be determined that an alternative content category should be identified if an accuracy of the user response information is high (e.g., a threshold number or percentage of correct responses to questions is met) and no further value may be derived (e.g., no further user psychographic data of value may be generated) from transmission of entertainment information corresponding to the current content category. In yet other embodiments, the user may indicate a desire to receive entertainment information corresponding to an alternative content category. It should be appreciated that business rules may specify any of a variety of conditions that may dictate that an alternative content category should be identified.

The alternative content category may be identified in accordance with any of the methodologies previously described. For example, the alternative content category may be identified based at least in part on available demographic data and/or historical preference data associated with the user, based at least in part on an indication of a selection of an alternative content category by the user from among a candidate content categories, based at least in part on previously generated user psychographic data, and so forth. Upon identification of the alternative content category, alternative entertainment information classified or categorized according to the alternative content category may be identified at block 506 and the alternative entertainment information may be transmitted for presentation to the user at block 508.

The illustrative method 500 may be repeated any number of times as specified by business rule(s). The method 500 provides an advantage of identifying when user response information may no longer be providing valuable user psychographic data and dynamically modifying the entertainment information that is presented to the user in order to obtain additional user response information from which useful user psychographic data may be generated.

Figure 6:
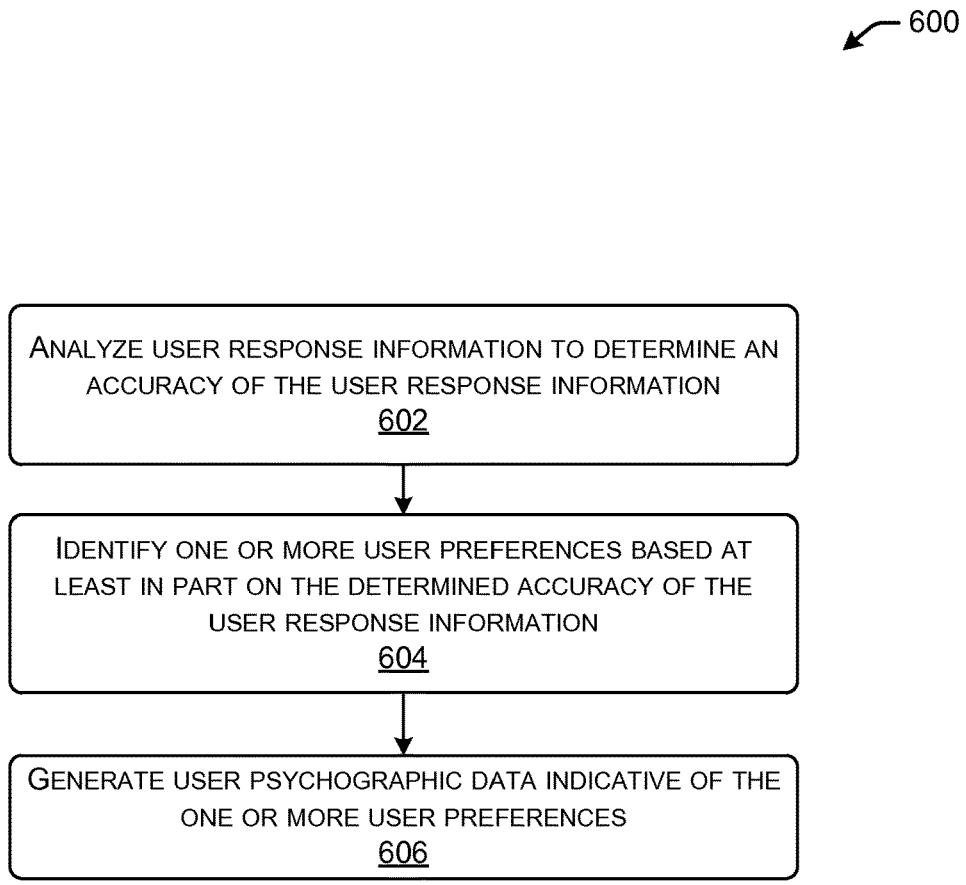
FIG. 6 is a process flow diagram of an illustrative method for generating user psychographic data based at least in part on a determined accuracy of user response information in accordance with one or more embodiments of the disclosure.

FIG. 6 is a process flow diagram of an illustrative method 600 for generating user psychographic data based at least in part on a determined accuracy of user response information. In accordance with various embodiments of the disclosure, the operations of illustrative method 600 may be performed at least in part upon execution of computer-executable instructions provided as part of the user psychographic data generation engine module 214.

At block 602, user response information received on behalf of a user in response to entertainment information presented to the user may be analyzed to determine an accuracy of the user response information. The accuracy of the user response information may be determined according to any suitable metric including any of those previously described.

At block 604, one or more user preferences may be identified based at least in part on the determined accuracy of the user response information. At block 606, user psychographic data indicative of the one or more user preferences may be generated. As a non-limiting example, in those embodiments in which an accuracy of the user response information is determined to be high, user psychographic data indicating the user's positive preference for subject matter to which the entertainment information relates may be generated. Similarly, user psychographic data may be also be generated based on an assessment that an accuracy of the user response information is low. For example, if an accuracy of the user response information is low, user psychographic data indicating the user's lack of preference for subject matter to which the entertainment information relates may be generated. Thus, a determined accuracy of the user response information may be correlated, either positively or negatively, with user preferences. In addition, in certain embodiments, at least a portion of the user psychographic data may be generated based on the user's selection of a content category. For example, it may be determined that the user has a positive affinity for subject matter classified according to the selected content category and a negative affinity (although of potentially lesser magnitude) for subject matter corresponding to the unselected content categories.

Figure 7:
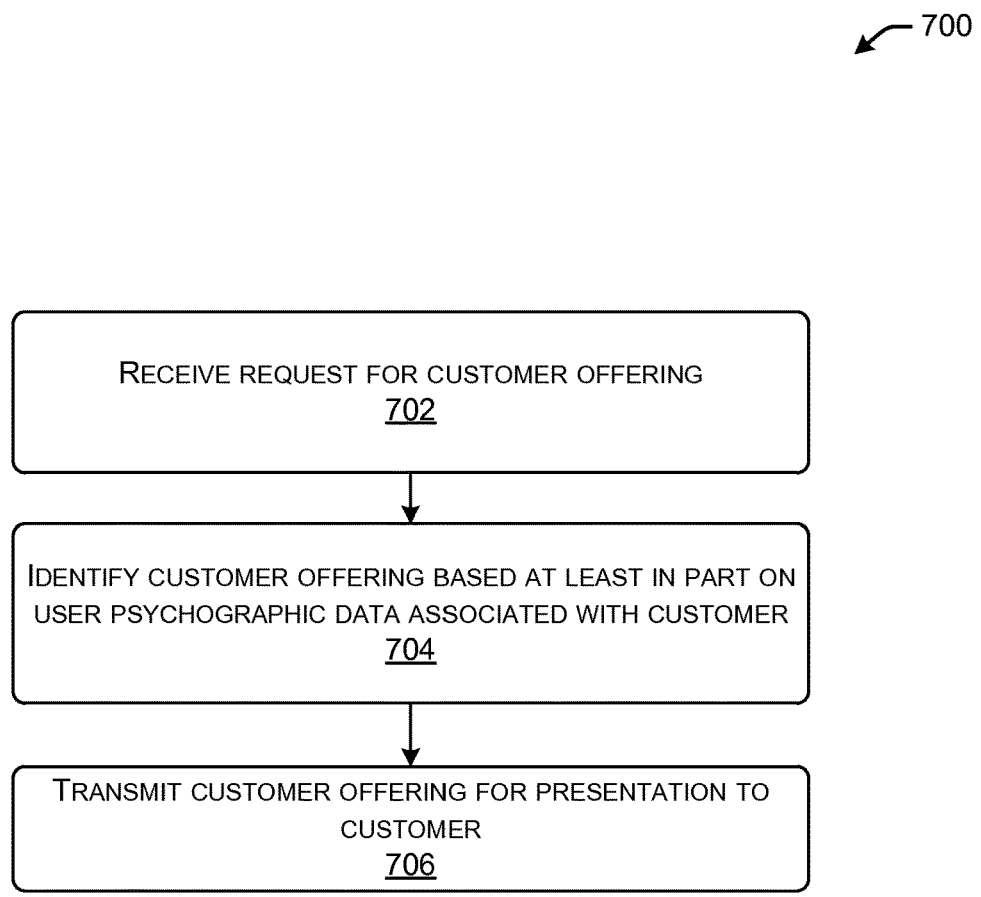
FIG. 7 is a process flow diagram of an illustrative method for receiving a request for identifying a customer offering, identifying the customer offering based at least in part on user psychographic data, and transmitting the customer offering for presentation to the customer in accordance with one or more embodiments of the disclosure.

FIG. 7 is a process flow diagram of an illustrative method 700 for receiving a request for identifying a customer offering, identifying the customer offering based at least in part on user psychographic data, and transmitting the customer offering for presentation to the customer. In accordance with various embodiments of the disclosure, operations of the illustrative method 700 may be performed at least in part by the treatment engine 122 and/or the ad insertion engine 126, or more specifically, upon execution of computer-executable instructions provided as part of the treatment engine module 216 and/or the ad insertion engine module 218.

At block 702, a request for a customer offering may be received. The request may be received, for example, by the treatment engine 122 from a customer service agent. The request may be a request for a customer offering for targeting to a user with whom the customer service agent is currently interacting.

At block 704, the customer offering may be identified based at least in part on user psychographic data associated with the customer. At block 706, the identified customer offering may be transmitted for presentation to the customer. In certain embodiments, the customer offering may be a product or service offering that is identified based on user psychographic data associated with the customer. The product or service offering may be communicated to a customer service agent who may then present the offering to the customer. In other embodiments, the ad insertion engine 126 may be configured to identify advertisements) for targeting to the customer based at least in part on user psychographic data associated with the customer. In certain embodiments, the request for the customer offering may not be received. Rather, in certain embodiments, the treatment engine 122 and/or the ad insertion engine 126 may be configured to dynamically identify a customer offering based on various conditions. For example, the treatment engine 122 may be configured to periodically identify customer offerings based at least in part on user psychographic data and target the customer offerings through a variety of communication means. As another non-limiting example, the ad insertion engine 126 may be configured to dynamically identify advertisements based on user psychographic data and target the advertisements to a customer during a presentation of content to the customer. It should be appreciated that numerous other variations are within the scope of this disclosure.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, although specific example embodiments have been presented, it should be appreciated that numerous other examples are within the scope of this disclosure.

Additional types of CRSM that may be present in association with any of the components described herein (e.g., any of the components of the architecture 100 and/or the computer 202) may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, solid-state memory devices, or any other medium. Combinations of any of the above are also included within the scope of CRSM. Alternatively, computer-readable communication media may include computer-readable instructions, program modules, or other data transmitted within a data signal, such as a carrier wave, or other transmission. However, as used herein, CRSM does not include computer-readable communication media. Examples of computer-readable communication media, whether modulated using a carrier or not, include, but are not limited to, signals that a computer system or machine hosting or running a computer program can be configured to access, including signals downloaded through the Internet or other networks.

Although embodiments have been described in language specific to structural features and/or methodological acts, it is to be understood that the disclosure is not necessarily limited to the specific features or acts described. Rather, the specific features and acts are disclosed as illustrative forms of embodiments of the disclosure. Conditional language such as, for example, "can," "could," "might," or "may," unless specifically stated otherwise, or unless otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. One or more non-transitory computer-readable media comprising computer-executable instructions that responsive to execution cause operations to be performed comprising:

assigning a first queue position in a session queue to a communication session between a user device and a system comprising one or more computers based at least in part on an order in which the communication session is initiated in relation to at least one other communication session between at least one other user device and the system;

determining that a first hold time associated with the first queue position exceeds a predetermined threshold;

identifying first entertainment information based at least in part on a first content category selection received from the user device, wherein the first entertainment information comprises one or more questions classified according to the first content category;

responsive to determining that the first hold time exceeds the predetermined threshold, transmitting, to the user device during the communication session, the first entertainment information;

receiving, from the user device during the communication session and on behalf of a user of the user device, user response information, wherein the user response information indicates a respective user response corresponding to each of the one or more questions;
generating user psychographic data associated with the user based at least in part on the user response information;
determining an accuracy of the user response information by determining a number of correct responses to the one or more questions;
determining, based on the determined number of correct responses to the one or more questions, that the accuracy of the user response information falls below a threshold level of accuracy;
determining, based at least in part on determining that the user response information falls below the threshold level of accuracy, that second entertainment information corresponding to a second content category should be presented to the user, wherein the second content category is a different content category than the first content category;
identifying the second content category, wherein identifying the second content category comprises determining the second content category based on at least the user psychographic data generated based at least in part on the user information corresponding to each of the one or more questions corresponding to the first content category;
identifying the second entertainment information corresponding to the second content category;
assigning a second queue position in the session queue to the communication session based at least in part on at least one change to the session queue;
determining a second hold time associated with the second queue position;
determining that the second hold time exceeds the predetermined threshold; and
responsive to determining that the second hold time exceeds the predetermined threshold, transmitting, to the user device during the communication session, the second entertainment information.

2. The one or more computer-readable media of claim 1, the operations further comprising:
identifying at least one offering for targeting to the user based at least in part on the user psychographic data.

3. The one or more computer-readable media of claim 2, wherein the at least one offering comprises at least one of:
i) a product or service offering, or
ii) an advertisement.

4. The one or more computer-readable media of claim 1, wherein the generating the user psychographic data comprises:
determining one or more user preferences associated with the user based at least in part on the accuracy of the at least one respective user response,
wherein the user psychographic data comprises data associated with the one or more user preferences.

5. The one or more computer-readable media of claim 1, wherein determining the accuracy of the user response information comprises determining a number of the one or more questions for which the user response information includes a corresponding accurate response.

6. The one or more computer-readable media of claim 1, wherein determining that the second entertainment information corresponding to the second content category should be presented to the user comprises determining that the number of one or more questions is greater than or equal to a first threshold number or determining that the number of the one or more questions is less than or equal to a second threshold number.

7. The one or more computer-readable media of claim 1, wherein the one or more questions comprise at least one trivia question.

8. A method, comprising:
assigning, by a system comprising one or more computers, a first queue position in a session queue to a communication session between a user device and the system based at least in part on an order in which the communication session is initiated in relation to at least one other communication session between at least one other user device and the system;
determining that a first hold time associated with the first queue position exceeds a predetermined threshold;
identifying, by the system, first entertainment information corresponding to a first content category selection received from the user device, wherein the first entertainment information comprises one or more questions classified according to the first content category;
responsive to determining that the first hold time exceeds the predetermined threshold, transmitting, by the system to the user device during the communication session, the first entertainment information;
receiving, by the system from the user device during the communication session and on behalf of a user of the user device, user response information responsive to the first entertainment information;
generating, by the system, user psychographic data associated with the user based at least in part on the user response information;
identifying, by the system, at least one offering for targeting to the user based at least in part on the user psychographic data;
determining, by the system, an accuracy of the user response information by determining a number of correct responses to the one or more questions;
determining, by the system, based on the determined number of correct responses to the one or more questions, that the accuracy of the user response information falls below a threshold level of accuracy;
determining, by the system and based at least in part on determining that the user response information falls below the threshold level of accuracy, that second entertainment information corresponding to a second content category should be presented to the user, wherein the second content category is a different content category than the first content category;
identifying, by the system, the second content category, wherein identifying the second content category comprises determining the second content category based on at least the user or the user psychographic data generated based at least in part on the user information corresponding to each of the one or more questions corresponding to the first content category;
identifying, by the system, the second entertainment information corresponding to the second content category;
assigning a second queue position in the session queue to the communication session based at least in part on at least one change to the session queue;
determining a second hold time associated with the second queue position;
determining that the second hold time exceeds the predetermined threshold; and responsive to determining the second hold time exceeds the predetermined threshold, transmitting, by the system to the user device during the communication session, the second entertainment information.

9. The method of claim 8, further comprising:
determining, by the system, one or more preferences associated with the user based at least in part on the accuracy of the user response information,
wherein the psychographic data comprises data associated with the one or more preferences, and
wherein the at least one offering is identified based at least in part on a correspondence between one or more characteristics associated with the at least one offering and the one or more preferences.

10. The method of claim 8, further comprising:
transmitting, by the system to the user device during the communication session, an indication of the at least one offering,
wherein the at least one offering comprises at least one of:
i) a product or service offering, or
ii) an advertisement.

11. The method of claim 8, wherein the first entertainment information comprises one or more trivia questions, and wherein the one or more trivia questions comprise content having one or more attributes associated with the first content category.

12. The method of claim 8, wherein the first entertainment information comprises a question set comprising one or more questions, and wherein the one or more questions are transmitted for sequential presentation to the user, the method further comprising:
transmitting, by the system to the user device during the communication session, respective candidate response information associated with each question in the question set; and
transmitting, by the system to the user device during the communication session, respective instruction information corresponding to the respective candidate response information,
wherein the respective instruction information identifies a set of user inputs corresponding to the respective candidate response information.

13. The method of claim 12, wherein the respective candidate response information comprises a candidate response set comprising a plurality of candidate responses to a corresponding question in the question set, and wherein each user input in the set of user inputs is associated with a respective corresponding one candidate response of the plurality of candidate responses, the method further comprising:
receiving, by the system from the user device during the communication session, an indication of a selection by the user of one user input in the set of user inputs for each question included in the question set.

14. The method of claim 13, wherein, for each question in the question set, the respective candidate response corresponding to the one user input forms at least part of the response information.

15. The method of claim 12, wherein each user input included in the set of user inputs corresponds to a respective voice input or a respective dual-tone multi frequency (DTMF) input.

16. The method of claim 8, further comprising:
assigning, by the system, a third queue position in the session queue to the communication session;
determining, by the system, that the third queue position corresponds to a predetermined queue position; and
transmitting, by the system to the user device during the communication session, a predetermined question in the question set.

17. The method of claim 16, wherein a difficulty level associated with the predetermined question does not exceed a respective difficulty level associated with each other question in the question set.

18. The method of claim 8, further comprising:
identifying, by the system, the first entertainment information based at least in part on at least one of: i) historical preference data indicating one or more preferences associated with the user or ii) demographic data associated with the user.

19. The method of claim 8, further comprising:
transmitting, by the system to the user device during the communication session, a request for authorization to transmit the first entertainment information; and
receiving, by the system from the user device during the communication session and on behalf of the user, a response to the request, wherein the response indicates that the user authorizes transmission of the first entertainment information,
wherein the first entertainment information is transmitted based on at least in part on receipt of the response.

20. A system, comprising:
one or more computers comprising:
at least one memory storing computer-executable instructions; and
at least one processor configured to access the at least one memory and execute the computer-executable instructions to:
assign a first queue position in a session queue to a communication session between a user device and the system based at least in part on an order in which the communication session is initiated in relation to at least one other communication session between at least one other user device and the system;
determine that a first hold time associated with the first queue position exceeds a predetermined threshold;
identify first entertainment information corresponding to a first content category selection received from the user device, wherein the first entertainment information comprises one or more questions classified according to the first content category;
responsive to the determination that the first hold time exceeds the predetermined threshold, transmit, to the user device during the communication session, the first entertainment information;
receive, from the user device during the communication session and on behalf of a user of the user device, user response information in response to the first entertainment information;
generate user psychographic data associated with the user based at least in part on the user response information, wherein the user psychographic data comprises preference data relating to one or more preferences associated with the user;
identify at least one offering for targeting to the user based at least in part on the user psychographic data;
determine an accuracy of the user response information by determining a number of correct responses to the one or more questions;

determine, based on the determined number of correct responses to the one or more questions, that the accuracy of the user response information falls below a threshold level of accuracy;
determine, based at least in part on determining that the user response information falls below the threshold level of accuracy, that second entertainment information corresponding to a second content category should be presented to the user, wherein the second content category is a different content category than the first content category;
identify the second content category, wherein the at least one processor is configured to identify the second content category by executing the computer-executable instructions to determine the second content category based on at least the user psychographic data generated based at least in part on the user information corresponding to each of the one or more questions corresponding to the first content category;
identify the second entertainment information corresponding to the second content category;
assign a second queue position in the session queue to the communication session based at least in part on at least one change to the session queue;
determine a second hold time associated with the second queue position;
determine that the second hold time exceeds the predetermined threshold; and
responsive to the determination that the second hold time exceeds the predetermined threshold, transmit, to the user device during the communication session, the second entertainment information.

21. The system of claim 20, wherein the at least one processor is further configured to execute the computer-executable instructions to:
transmit, to the user device during the communication session, an indication of the at least one product or service offering,
wherein the at least one offering comprises at least one of:
i) a product or service offering, or
ii) an advertisement.

22. The system of claim 20, wherein the at least one processor is further configured to execute the computer-executable instructions to:
generate the preference data based at least in part on the accuracy of the user response information.

23. The system of claim 20, wherein the user is one of: i) a current subscriber or ii) a prospective subscriber of a product or service provider associated with the system.

24. The system of claim 20, wherein the system comprises a customer service management system associated with a product or service provider.

* * * * *